United States Patent
Koschig

(10) Patent No.: US 6,855,081 B2
(45) Date of Patent: Feb. 15, 2005

(54) ARTICULATED CHAIN

(75) Inventor: Richard Koschig, Freising (DE)

(73) Assignee: Joh. Winklhofer & Sohne GmbH and CO.KG, Munich (DE)

( * ) Notice: Subject to any disclaimer, the term of this patent is extended or adjusted under 35 U.S.C. 154(b) by 131 days.

(21) Appl. No.: 10/267,618

(22) Filed: Oct. 9, 2002

(65) Prior Publication Data

US 2003/0073532 A1 Apr. 17, 2003

(30) Foreign Application Priority Data

Oct. 16, 2001 (DE) .................................. 201 16 978 U

(51) Int. Cl.$^7$ .......................... E16G 13/02; E16G 13/18; C22C 38/00
(52) U.S. Cl. .................. 474/231; 474/91; 474/234; 148/330; 59/78
(58) Field of Search ................... 474/231, 230, 474/227–229, 206–207, 91; 59/78, 4; 148/570.575, 330, 567, 224; 428/457, 627, 681

(56) References Cited

U.S. PATENT DOCUMENTS

| | | | | |
|---|---|---|---|---|
| 4,094,515 A | * | 6/1978 | Araya et al. ................ | 474/231 |
| 4,615,171 A | * | 10/1986 | Burk ............................ | 59/78 |
| 4,623,595 A | | 11/1986 | Futamura et al. | |
| 4,995,852 A | * | 2/1991 | Takahashi et al. ............ | 474/91 |
| 5,032,192 A | * | 7/1991 | Tsuchiya et al. ............ | 148/567 |
| 5,412,934 A | * | 5/1995 | Furuyama .................... | 59/78 |
| 6,270,595 B1 | * | 8/2001 | Takayama et al. ......... | 148/570 |
| 6,602,829 B1 | * | 8/2003 | Fusser ........................ | 148/330 |

FOREIGN PATENT DOCUMENTS

| | | | | | |
|---|---|---|---|---|---|
| DE | (2263491) A | * | 7/1993 | ........... | C23C/11/08 |
| DE | 19822928 A1 | | 11/1999 | | |
| FR | (2812050) A | * | 1/2002 | ........... | F16D/69/02 |
| JP | (52-126611) A | * | 10/1977 | ........... | F16G/13/02 |
| JP | (57-67170) A | * | 4/1982 | ........... | C23B/35/02 |
| JP | 2072218 | | 3/1990 | | |

OTHER PUBLICATIONS

European Community, Jun. 16, 1980, Tachibana Shigeyuki.

* cited by examiner

*Primary Examiner*—Marcus Charles
(74) *Attorney, Agent, or Firm*—Marshall, Gerstein & Borun LLP

(57) ABSTRACT

An articulated chain comprising chain links interconnected at chain hinges, with each chain hinge comprises a hinge pin and a hinge bearing surrounding said hinge pin, and the hinge pins are provided with a bonded layer on the outer circumferential surface thereof. The hinge bearings are produced from a sintered material, with the bottom of the borided layer, which faces the base material, being provided with teeth.

15 Claims, 4 Drawing Sheets

ARTICULATED CHAIN

BACKGROUND OF THE INVENTION

The present invention relates to an articulated chain comprising chain links interconnected at chain hinges, wherein each chain hinge comprises a hinge pin and a hinge bearing surrounding said hinge pin.

Such articulated chains are often used in the field of technology as drive chains and also as conveying chains. In one of its simplest forms such an articulated chain is implemented as a flat-link articulated chain in the case of which inner chain links and outer chain links are arranged in alternating succession and the connection is established via a hinge sleeve of the inner chain link and a hinge pin of the outer chain link passed through this hinge sleeve. Wear of a chain occurs in many cases within the hinge bearing due to the sliding movement of the hinge pin on the inner surface of the hinge bearing. A large number of different measures has been taken so as to improve, with a lasting effect, these wear properties which are of decisive importance for the service life of a chain. On the one hand, structural measures have been taken and, on the other hand, it has been attempted to achieve an improvement on the basis of the materials selected and the tempering/heat treatment of said materials. Also the lubrication of the hinge bearing is of great importance in the prior art. Many of the known measures do not produce the expected effect in practice and, consequently, only a small number of these measures have actually gained acceptance. Nevertheless, attempts to improve the service life of articulated chains are still made.

SUMMARY OF THE INVENTION

It is therefore the object of the present invention to provide an articulated chain of the type mentioned at the start, which exhibits good wear properties.

In order to achieve this, the present invention is so conceived that the hinge pins are provided with a borided layer on the outer circumferential surface thereof and the hinge bearings are produced from a sintered material. A combination of materials of this kind or this kind of a heat treatment of the pin in connection with the material selected for the hinge bearing has not been used in the prior art up to now. Service life tests have shown that especially this combination leads to a substantial increase in service life.

Due to the boronizing, a surface layer is produced which has a surface hardness of 1600+400 HV01. Prior to the boronizing step, the base material can be subjected to a heat treatment and have a hardness of 440+60 HV10.

In accordance with an advantageous embodiment, the layer thickness of the borided layer can lie between 15 $\mu$m and 17 $\mu$m, preferably 30 $\mu$m and 20 $\mu$m. Tests have shown that, on the one hand, such a layer thickness can be produced in a way which makes sense from the point of view of production technology and that, on the other hand, this layer thickness causes a sufficient reduction of wear as long as the service life of chains normally lasts.

It will also be advantageous when the borided layer comprises $Fe_2B$ as main component. This form of boride proves to be particularly stable for the selected cases of use.

A measure which, in the case of one variant, proved to be particularly advantageous is the measure of providing the layer bottom of the borided layer with teeth, said layer bottom facing the base material. The teeth guarantee that the layer is reliably anchored in the base material. The size of teeth can be varied by production-technology measures. The average height of the teeth may, preferably, correspond to ¼ to ½ of the layer thickness.

These teeth may then be followed by a diffusion zone in the base material, said diffusion zone containing already a certain amount of boride grains.

A very simple and economy-priced embodiment is so conceived that the base material is a steel, preferably a case-hardening steel. Such a base material is excellently suitable for boronizing so as to achieve the desired layer thicknesses and layer structures.

The base material variant which has proved to be most advantageous up to now is a base material consisting of 16MnCr5 or 20MnCr5.

In accordance with an advantageous embodiment, the material for the hinge bearing can be a hardened sintered material on a basis of steel. The hardened surface of the hinge bearing contributes once more to an increase in service life.

The sintered material can preferably have the following chemical composition:

1–4% Ni,

1–3% Cu, 0.5–1.5% Mo, 0.3–1.0% C and balance Fe (mass percentages in %).

It is here also possible that the composition of the powder-metallurgical material varies over the layer thickness and the layer width of the hinge bearing. It would, for example, be possible to select the percentage of carbon such that, for achieving the desired hardness, it is higher on the surface than in the core of the hinge bearing.

After the sintering step, the hinge bearing can preferably have a density of >6.2 $g/cm^3$. Much higher density values are normally not worth the effort, since a certain degree of porosity is by no means unwanted for certain cases of use.

It will be advantageous to adjust the hardness of the hinge bearing such that it corresponds to 700+200HV0.1.

In addition, the hinge bearing can be impregnated with a lubricant. A lubricant which is suitable for this purpose is the OY100 lubricant from the firm Klüber Lubrication. After impregnation with the lubricant, a spin drying step is normally carried out so as to prevent excessive lubricant residues on the surface, which may lead to an adhesion effect.

The hinge bearing can preferably be defined by a cylindrical hinge sleeve. In the case of thicker chain links, this hinge sleeve may also be pressed-fitted in the chain link.

A particularly advantageous embodiment is so conceived that the chain links provided are alternating inner and outer chain links, the inner chain links comprising parallel inner link plates and hinge sleeves (which consist of the sintered material) interconnecting the same, and the outer chain links comprising parallel outer link plates and hinge pins (provided with the borided layer) interconnecting the same. This is a conventional structural design of a flat link articulated chain of the type used most in the prior art. In many cases, the hinge sleeves have additionally arranged thereon running rollers by means of which the wear can be reduced in comparison with engaging chain-drive sprockets.

BRIEF DESCRIPTION OF THE DRAWINGS

In the following, one embodiment of the present invention will be explained in detail making reference to a drawing, in which.

DETAILED DESCRIPTION OF THE EMBODIMENT

Figure 1:
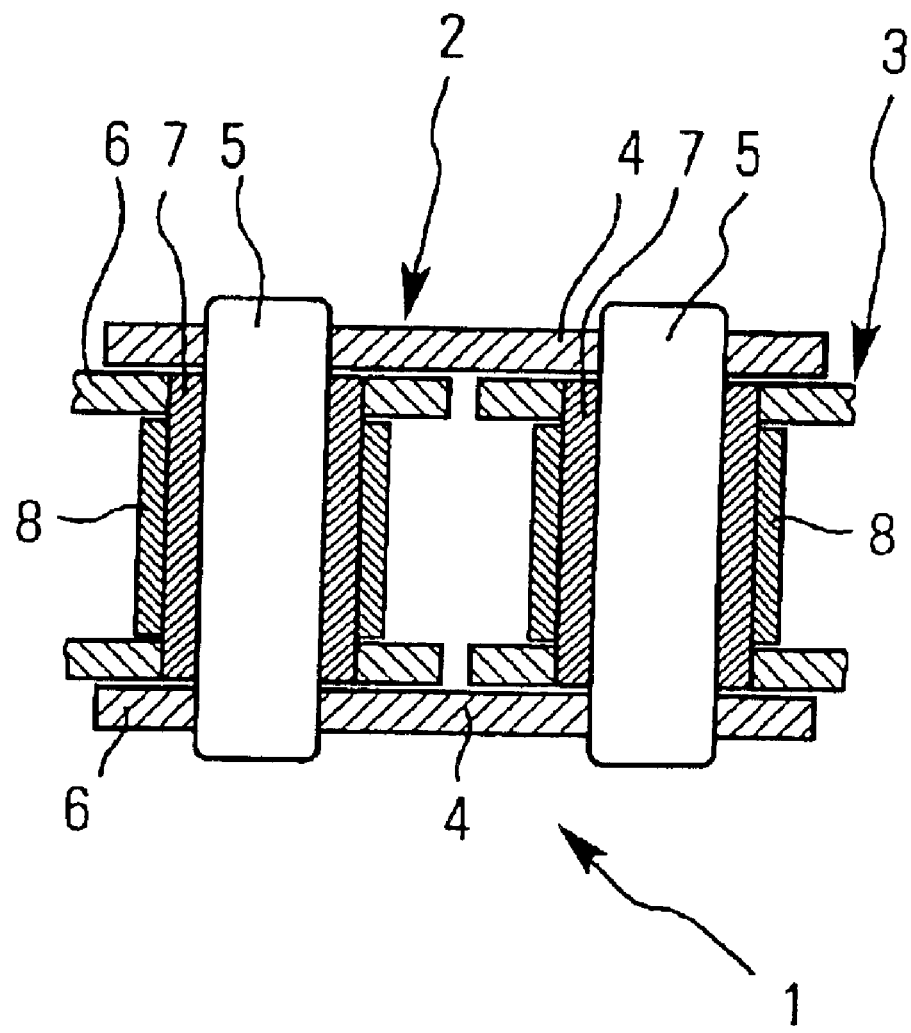
FIG. 1 shows a detail of a roller chain in a fully sectional view.

The roller chain 1 shown in FIG. 1 is composed of outer chain links 2 and inner chain links 3 which are arranged in alternating succession and connected to one another. The outer chain links comprise two parallel outer link plates 4 which are interconnected in spaced relationship with one another via two hinge pins 5 that are arranged in parallel with one another. The hinge pins 5 are press fitted in the respective outer link plates 4.

The inner chain links 3 comprise two inner link plates 6 which are arranged in spaced relationship with one another and which are interconnected via two respective hinge sleeves 7 that are arranged in parallel with one another. The hinge sleeves 7 have their end portions press-fitted in the inner link plates 6 and maintain these inner link plates 6 in spaced relationship with one another. Running rollers 8 are arranged coaxially with the hinge sleeves 7, said running rollers 8 rotating on said hinge sleeves in a freely rotatable manner. The hinge pins 5, the hinge sleeves 7 and the running rollers 8 each have the shape of a cylinder or of a cylindrical sleeve. The outer link plates 4 and the inner link plates 6 are produced from a plate material, in particular a steel material, and have a waisted shape (not shown), as is usually the case in this field.

Figure 2:
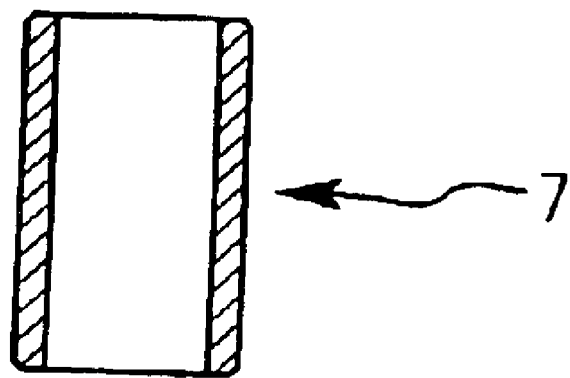
FIG. 2 shows the hinge sleeve of FIG. 1 in a fully sectional view.
Figure 3:
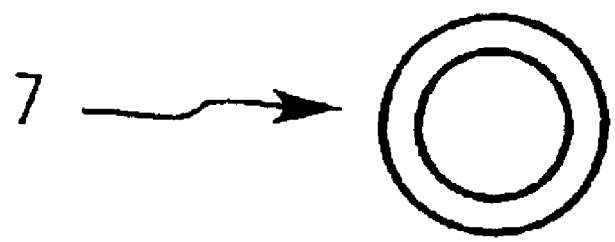
FIG. 3 shows the hinge sleeve of FIG. 1 in a front view.

The hinge sleeve 7 shown in FIGS. 2 and 3 consists of a sintered material. This sintered material is based on steel and has the chemical composition: 1–4% nickel, 1–3% copper, 0.5–1.5% molybdenum, 0.3–1.0% carbon, balance iron (mass percentages in %). The sintering process is carried out such that the density of the hinge sleeve is >6.2 g/cm$^3$. A certain porosity of the sintered material is even desired so that said sintered material can be impregnated with a lubricant. The lubricant used for impregnating the sintered material is the lubricant OY100 of the firm of Klüber Lubrication. When impregnating with this lubricant has been carried out, especially by applying a vacuum, spin drying is performed so as to prevent superfluous lubricant from adhering to the outer surfaces of the hinge sleeve 7. The present hinge sleeve 7 is hardened. Due to the thin-walled nature of the sleeve through-hardening takes place. After this process, the hardness amounts to 700+200 HVO.1. Annealing is not effected. This results in a tensile strength and a yield strength of 450 to 500 N/qmm for the assembled state. The elongation at rupture is 1% at the most in this hardened state. In view of the desired porosity, the density is 6.6 g/cm$^3$ at the most and, preferably, the density should have an average value of 6.4 g/cm$^3$.

Figure 4:
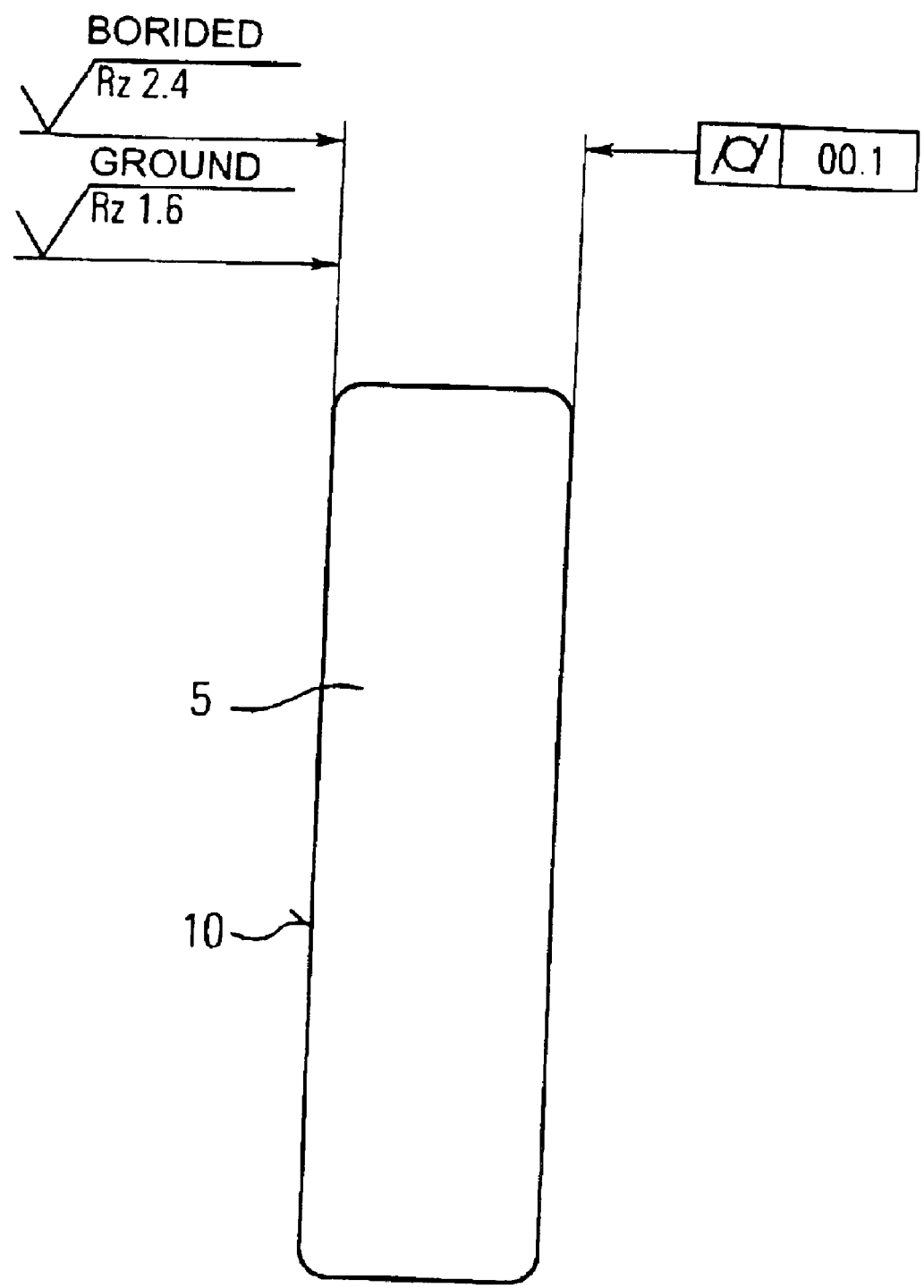
FIG. 4 shows a hinge pin of FIG. 1 in an enlarged representation.
Figure 5:
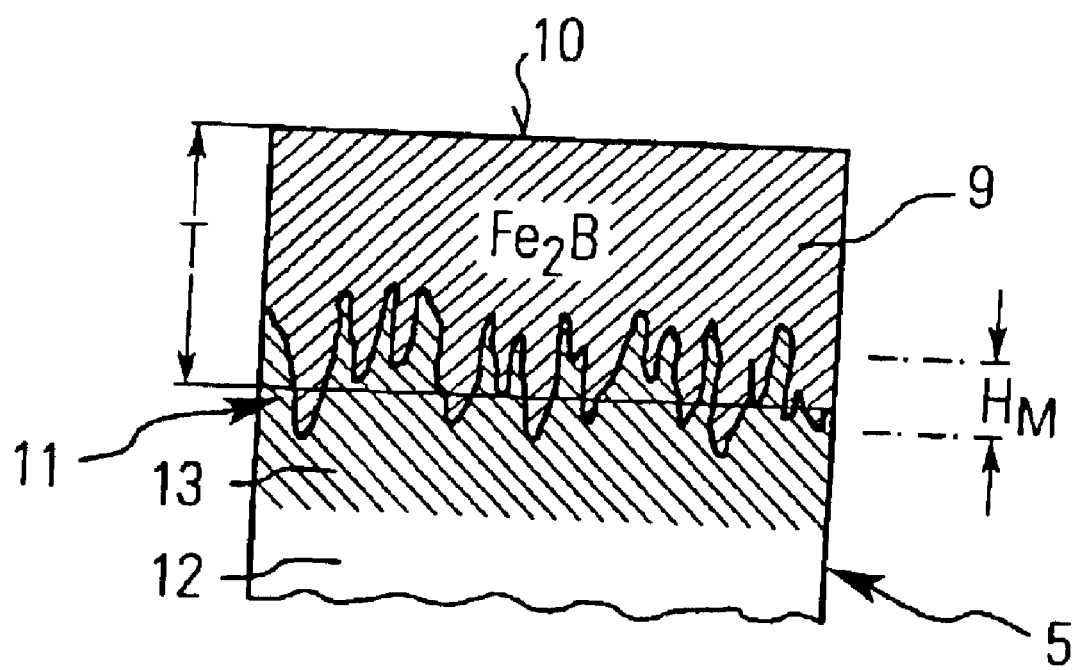
FIG. 5 shows a schematic representation of the surface condition of the hinge pin of FIG. 4 in an enlarged sectional view.

The hinge pin 5 shown in FIG. 4 and used in combination with this hinge sleeve 7 produced from a sintered material consists of a case-hardening steel, in the present case a 16MnCr5. Also the use of a 20MnCr5 is imaginable. In the production process, the hinge pin is rough ground to Rz1.6 (average peak-to-valley height), such that a truth of running of 0.01 mm is obtained. Subsequently, boronizing is carried out so that a borided layer 9 is formed on the outer circumferential surface 10. After the boronizing, the surface roughness is Rz2.4.

The borided layer having an average layer thickness T consists primarily of Fe$_2$B. It can be referred to as a closed surface layer. The bottom of the borided layer 9 is provided with teeth 11 by means of which stable anchoring in the base material 12 is achieved. These teeth can be obtained by means of suitable process parameters. The averaged height H$_M$ of the teeth 11 amounts to approx. ⅓ of the layer thickness T of the borided layer 9. This teeth height H$_M$ is preferably adjusted such that it amounts to 0.25 to 0.5 of the layer thickness T. These teeth 11 are followed by a diffusion zone 13 in which a few boride grains are already present, the number of said boride grains decreasing towards the bottom so that the diffusion zone 13 merges with the base material 12. The layer thickness T is approx. 30 μm with a tolerance of +20 μm. After the boronizing, a surface hardness of 1600+400 HV01 exists. Due to a tempering/heat treatment KHV is 400+60HV10.

The combination of the hinge structure comprising the hinge sleeve 7, which consists of the above-mentioned sintered material, and the hinge pin 5, which has been subjected to a suitable surface treatment, provides wear resistance properties which are exceptionally good.

What is claimed is:

1. An articulated chain (1), comprising chain links (2,3) interconnected at chain hinges, each chain hinge comprises a hinge pin (5) and a hinge bearing (7) surrounding the hinge pin (5), the hinge pins (5) being provided with a bonded layer (9) on the Outer circumferential surface (10) thereof, the hinge bearings (7) being produced from a sintered material, and the bottom of the bonded layer (9) being provided with teeth (11), with the bottom facing the base material (12), and with the average teeth height (H$_M$) of the teeth (11) lying between 0.25 and 0.5 of the layer thickness (T) of the bonded layer (9).

2. An articulated chain (1) according to claim 1, wherein the layer thickness (T) of the borided layer (9) lies between 15 μm and 70 μm.

3. An articulated chain (1) according to claim 2, and wherein the layer thickness is between 30 μm and 20 μm.

4. An articulated chain (1) according to claim 1, wherein the borided layer (9) comprises Fe$_2$B as a main component.

5. An articulated chain (1) according to claim 1, wherein the teeth (11) are followed by a diffusion zone (13) in the base material (12).

6. An articulated chain (1) according to claim 1, wherein the base material (12) is a steel.

7. An articulated chain (1) according to claim 6, wherein the base material is case-hardening steel.

8. An articulated chain (1) according to claim 6, wherein the base material (12) is one of a 16MnCr5, a 20MnCr5, or a mixture thereof.

9. An articulated chain (1) according to claim 1, wherein the material for the hinge bearing (7) is a hardened sintered material on a basis of steel.

10. An articulated chain (1) according to claim 9, wherein the sintered material comprises:

(a) 1–4% nickel, (b) 1–3% copper, (c) 0.5–1.5% molybdenum, (d) 0.3–1.0% carbon and (e) balance iron (mass percentages in %).

11. An articulated chain (1) according to claim 1, wherein the hinge bearing (7) has a density of >6.2 g/cm$^3$.

12. An articulated chain (1) according to claim 1, wherein the hinge bearing (7) has a hardness of 700+200 HVO.1.

13. An articulated chain (1) according to claim 1, wherein the hinge bearing (7) is impregnated with a lubricant.

14. An articulated chain (1) according to claim 1, wherein the hinge bearing (7) is defined by a cylindrical hinge sleeve (7).

15. An articulated chain (1) according to claim 14, wherein the chain links provided are alternating inner and outer chain links (2, 3), the inner chain links (3) comprising parallel inner link plates (6) and hinge sleeves (7) interconnecting the same, and the outer chain links (2) comprising parallel outer link plates (4) and hinge pins (5) interconnecting the same.

* * * * *

UNITED STATES PATENT AND TRADEMARK OFFICE
CERTIFICATE OF CORRECTION

PATENT NO. : 6,855,081 B2
DATED : February 15, 2005
INVENTOR(S) : Richard Koschig It is certified that error appears in the above-identified patent and that said Letters Patent is hereby corrected as shown below:

<u>Title page,</u>
Item [57], ABSTRACT,
Line 4, please delete "bonded" and replace with -- borided --

<u>Column 4,</u>
Lines 31, 34 and 38, please delete "bonded" and replace with -- borided --
Line 32, please delete "Outer" and replace with -- outer --.

Signed and Sealed this

Fourteenth Day of June, 2005

JON W. DUDAS
*Director of the United States Patent and Trademark Office*